United States Patent [19]

Yamada et al.

[11] Patent Number: 5,219,681
[45] Date of Patent: Jun. 15, 1993

[54] LITHIUM CELL

[75] Inventors: Motoyuki Yamada; Osamu Watanabe; Toru Nakanishi, all of Kanagawa; Minoru Takamizawa, Tokyo, all of Japan

[73] Assignee: Shin-Etsu Chemical Co., Ltd., Tokyo, Japan

[21] Appl. No.: 771,432

[22] Filed: Oct. 10, 1991

[30] Foreign Application Priority Data

Oct. 11, 1990 [JP] Japan .................................. 2-272858

[51] Int. Cl.$^5$ ............................................. H01M 6/18
[52] U.S. Cl. ................................. 429/192; 429/191; 429/218; 252/62.2; 252/500
[58] Field of Search .......................... 429/192, 191, 218

[56] References Cited

U.S. PATENT DOCUMENTS 4,556,614 12/1985 le Mehauté et al. ................. 429/191
5,112,512 5/1992 Nakamura ............................ 429/192

FOREIGN PATENT DOCUMENTS 65356 5/1974 Japan .

OTHER PUBLICATIONS

Polyphosphazene-Poly(Olefin Oxide) Mixed Polymer Electrolyte, Abraham et al., from the *Journal of the Electrochemical Society*, vol. 36, No. 12 Dec. '89.

*Primary Examiner*—Olik Chaudhuri
*Assistant Examiner*—M. Nuzzolillo
*Attorney, Agent, or Firm*—Wyatt, Gerber, Burke and Badie

[57] ABSTRACT

A lithium cell having excellent discharging and recharging characteristics is proposed which is characteristic in the unique formulation of the polymeric solid electrolyte composition having a high ionic conductivity to fill the space between the anode and the cathode. The electrolyte composition comprises: (a) a block copolymer of styrene and 4-hydroxystyrene, of which the phenolic hydroxy groups in the 4-hydroxystyrene moiety are substituted by the grafting chains of poly(ethylene oxide) moiety having a specified chain length, (b) an ionic lithium salt and (c) a poly(ethylene oxide) in a specified weight proportion.

8 Claims, 4 Drawing Sheets

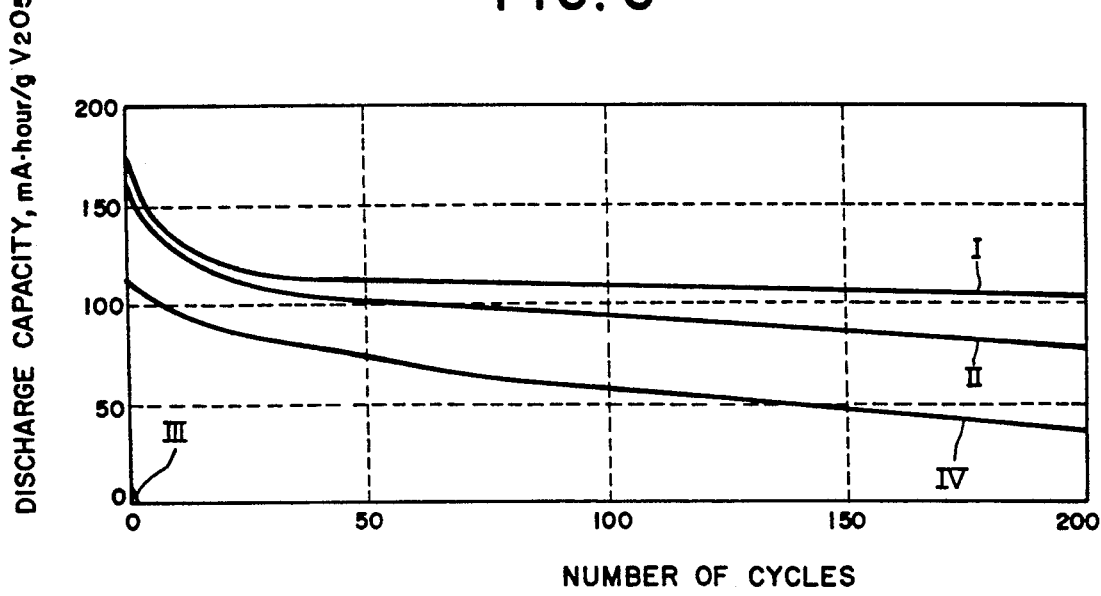

LITHIUM CELL

BACKGROUND OF THE INVENTION

The present invention relates to an improvement in a lithium cell, or lithium battery, comprising lithium metal or an alloy of lithium as the cathode-active material and a polymeric solid material containing a lithium salt as the ion-conductive electrolyte filling the space between the anode and cathode. More particularly, the invention relates to an improvement in a lithium cell, by which the cell can be imparted with a high ion-conductivity of the electrolyte and large discharge capacity as well as high stability of the cell performance by repeating cycles of discharging and recharging so that the cell can be used as a secondary or rechargeable battery.

Cells or batteries of which the cathode-active material is lithium metal or an alloy mainly composed of lithium are generally called a lithium cell or battery and the application fields of lithium cells are rapidly growing by virtue of the outstandingly long life as the most characteristic feature of lithium cells. A lithium cell has a basic structure comprising a cathode of a cathode-active material which is metallic lithium or an alloy of lithium, an anode of an anode-active material, for which various kinds of materials are known to be suitable depending on the desired characteristics of the cell, and an ion-conductive electrolyte composition filling the space between the cathode and anode.

Various types of electrolyte compositions are known as a material filling the space between the cathode and anode in a lithium cell, of which the most conventional is a highly flowable solution prepared by dissolving a lithium salt in an organic solvent. Electrolyte compositions in a gel-like form are also known as prepared by adding a gelation agent to an organic solution containing a lithium salt.

Along with the rapid progress in recent years in the electronics industry, in particular, toward the so-called microelectronics, lithium cells are also required to be smaller and smaller in size, thickness and weight as is typically the case when the cell is used as a backup power source for computer memories where the cell should be built in the instrument and integrated with the electronic circuit. Needless to say, lithium cells using a liquid or gelled electrolyte composition can hardly meet the requirement because a separator between the electrodes is indispensable in such a lithium cell in order to prevent direct contacting of the cathode and the anode in addition to the problems relative to the narrow temperature range for use of the cell and leakage of the liquid electrolyte composition when corrosion takes place in the casing or collector plates of the cell.

With an object to solve the above mentioned problems, attempts have been made to use an electrolyte in a solidified state and various kinds of polymeric solid electrolyte compositions are proposed therefor including combinations of a lithium salt with a polymer such as poly(ethylene oxide), poly(ethylene imine), polyphosphazene and the like. These polymeric solid electrolyte compositions, however, have several disadvantages that the ionic conductivity thereof is not high enough, that they are relatively poor in the mechanical strengths, that no reliable stability can be obtained in contacting between the electrodes and the electrolyte and so on so that lithium cells prepared with such a polymeric solid electrolyte composition have no practically satisfactory discharge characteristics with a relatively rapid decrease in the performance of the cell in the lapse of time resulting in limited durability. Therefore, no practically usable lithium cells have yet been obtained by using such a polymeric solid electrolyte composition.

SUMMARY OF THE INVENTION

Accordingly, the present invention has an object to provide a high-performance lithium cell having outstandingly long durability by using a novel polymeric solid electrolyte composition having high ionic conductivity and excellent moldability.

Thus, the lithium cell of the invention consists of (A) an anode, (B) a cathode facing the anode and (C) a polymeric solid electrolyte composition filling the space between the anode and cathode, which composition comprises:

(a) a block-graft copolymer consisting of block segments of a first monomeric unit represented by the general formula

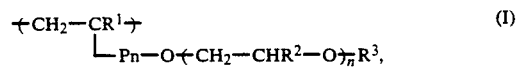

in which Pn is a 1,4-phenylene group, $R^1$ is a hydrogen atom, methyl group or ethyl group, $R^2$ is a hydrogen atom or methyl group, $R^3$ is an alkyl group, aryl group, acyl group or silyl group and the subscript n is a positive integer not exceeding 45, the graft chains of the poly(alkylene oxide) structure expressed by the formula $-(-CH_2-CHR^2-O-)_n-R^3$ having a number-average molecular weight not exceeding 2000, and block segments of a second monomeric unit represented by the general formula

in which $R^4$ is a hydrogen atom, methyl group or ethyl group and M is a group selected from the class consisting of vinyl, 1-methylethenyl, methoxycarbonyl, ethoxycarbonyl and unsubstituted or substituted phenyl groups;

(b) an ionic lithium salt; and (c) a poly(alkylene oxide) represented by the general formula

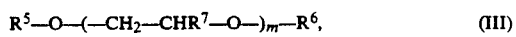

in which $R^5$ and $R^6$ are each, independently from the other, a hydrogen atom or an alkyl group having 1 to 3 carbon atoms, $R^7$ is a hydrogen atom or a methyl group and the subscript m is a positive integer not exceeding 45, having a number-average molecular weight not exceeding 2000.

BRIEF DESCRIPTION OF THE DRAWING

FIG. 6 is a graph showing the cycle characteristics of the same lithium cells as in FIGS. 2 to 5.

DETAILED DESCRIPTION OF THE PREFERRED EMBODIMENTS

Figure 1:
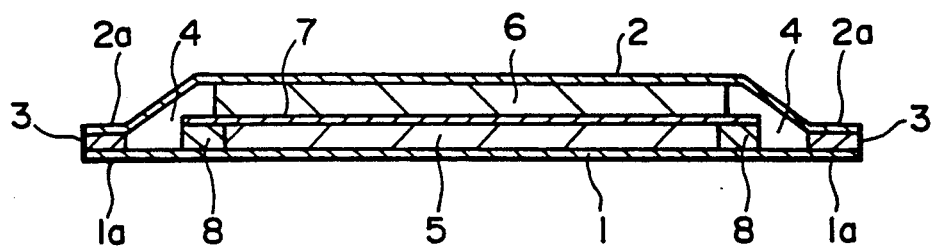
FIG. 1 is a vertical cross sectional view of the lithium cell as a typical embodiment of the present invention.

As is described above, the most characteristic feature of the inventive lithium cell consists in the use of a unique polymeric solid electrolyte composition filling the space between the anode and cathode. The essential ingredients of the polymeric solid electrolyte composition includes the specific block-graft copolymer as the component (a), an ionic lithium salt as the component (b) and a poly(alkylene oxide) as the component (c). This electrolyte composition has a much larger ionic conductivity than conventional electrolyte compositions used in lithium cells so that the lithium cell prepared by using the specific solid electrolyte composition has a greatly decreased internal resistance and the lithium cell can be imparted with improved discharge characteristics. In addition, the solid electrolyte composition used in the inventive lithium cell has good moldability and high mechanical strengths to exhibit good adhesion to the surfaces of the anode and cathode. Furthermore, the electrolyte composition has no reactivity with the materials forming the anode and cathode. Accordingly, the inventive lithium cell is stable in respect of the internal resistance and is free from the drawback due to leakage of the electrolyte solution in the lapse of time without decrease in the performance so that the lithium cell of the invention has outstandingly long durability as compared with conventional lithium cells.

The block-graft copolymer as the component (a) is the base ingredient of the polymeric solid electrolyte composition and consists of two types of the block-wise segments of the monomeric units represented by the general formulas (I) and (II) given above. The sequential arrangement of the first and the second types of the segments is not particularly limitative. It is preferable, however, that each of the block segments of the first type has a degree of polymerization of at least 10 and each of the block segments of the second type has a degree of polymerization of at least 300. It is further preferable that the molar ratio of the monomeric units of the first type and the second type is in the range from 1:30 to 30:1. When the molar fraction of the first type monomeric units is too small, the content of the grafting chains in the copolymer is accordingly too low so that the copolymer no longer serves as a base ingredient of the polymeric solid electrolyte composition and loses the miscibility with the poly(alkylene oxide) as the component (c) while maintaining the microscopic structure of phase separation. When the molar fraction of the first type monomeric units is too large, on the other hand, the body chain of the block copolymer molecules would have a poor mechanical strength.

The polymeric solid electrolyte composition used in the inventive lighium cell can be obtained, for exzmple, by first blending the above described block-graft copolymer as the componemt (a) with an ionic lithium salt as the component (b) to give a composite of the copolymer and the lithium salt followed by the admixture thereof with a poly(alkylene oxide) represented by the above given general formula (III) as the component (c).

The ionic lithium salt used here is not particularly limitative and any of the salts heretofore known to serve as the electrolyte in lithium cells can be used. Examples of suitable lithium salts include $LiPF_4$, $LiClO_4$, $LiBF_6$, $LiB(C_6H_5)_4$, $LiCF_3S$, $LiAs_6$ and the like and they can be used either singly or as a combination of two kinds or more according to need.

The amount of the ionic lithium salt in the electrolyte composition is in the range from 0.05 to 80% by moles or, preferably, form 0.1 to 50% by moles based on the amount of the alkylene oxide units in the grafting chains of the first type monomeric units in the block-graft copolymer as the component (a).

The poly(alkylene oxide) represented by the above given general formula (III) as the component (c) of the electrolyte composition is exemplified by diethylene glycol, triethylene glycol, tetraethylene glycol, polyethylene glycol, diethylene glycol monomethyl ether, polyethylene glycol monoethyl ether, polyethylene glycol monopropyl ether, diethylene glycol dimethyl ether, polyethylene glycol dimethyl ether, polyethylene glycol diethyl ether and polyethylene glycol dipropyl ether as well as those compounds equivalent to the above named compounds obtained by replacing the polyoxyethylene structure thereof with a corresponding polyoxypropylene structure. These poly(alkylene oxide) compounds can be used either singly or as a combination of two kinds or more according to need.

The amount of the poly(alkylene oxide) as the component (c) in the polymeric solid electrolyte composition is in the range from 0.05 to 200% by moles or, preferably, from 5 to 150% by moles based on the alkylene oxide units in the grafting chains of the block-graft copolymer as the component (a).

The poly(alkylene oxide) as the component (c) should preferably have an average molecular weight in the range from 130 to 2000. When the molecular weight thereof is too large, the ionic conductivity of the electrolyte composition is unduly low while, when the molecular weight of the poly(alkylene oxide) is too small, the compound has a low boiling point to be lost by vaporization in the lapse of time.

The block-graft copolymer as the component (a) in the electrolyte composition can be prepared, for example, by the following method. Thus, the precursor of the block-graft copolymer is a block copolymer consisting of the block segments of the monomeric units represented by the above given general formula (II) and the block segments consisting of the monomeric units derived from an unsubstituted or α-substituted, 4-hydroxystyrene represented by the general formula

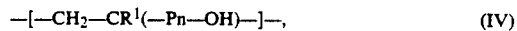

—[—$CH_2$—$CR^1$(—Pn—OH)—]—,     (IV)

in which Pn and $R^1$ each have the same meaning as defined before. This precursor block copolymer is subjected to the reaction of the phenolic hydroxy groups with an organometallic compound of an alkali metal represented by the general formula RMe, in which Me is an atom of an alkali metal such as sodium, potasssium and cesium and R is an organic species selected from the class consisting of tert-butyl ether, diphenyl ethylene, naphthalene, benzyl group and cumyl group so that the hydroxy group is converted into a carbanion. Thereafter, this carbanionized block copolymer is reacted with ethylene oxide or propylene oxide so as to grow the grafting chains having the polyoxyalkylene structure. After the degree of polymerization of the grafting chains have reached a desired value, the grafting reaction is terminated by the addition of a stopping agent such as acetic acid, organic halogen compounds and the like so as to block the terminal of the grafting chain with the group denoted by $R^3$ in the general formula (I).

The procedure for the preparation of the precursor block copolymer used in the above described method is as follows. Thus, an anionic living polymerization is performed of a monomeric mixture composed of 4-hydroxystyrene or α-methyl-4-hydroxystyrene having the phenolic hydroxy group protected with a tert-alkyl group or trialkylsilyl group as the first monomer to give the monomeric units of the general formula (IV) and a second monomer selected from the group consisting of vinyl monomers such as styrene, α-methylstyrene and the like, diene monomers such as butadiene, isoprene and the like, acrylic and methacrylic monomers such as methyl acrylate, ethyl acrylate, methyl methacrylate, ethyl methacrylate and the like, and so on to provide the monomeric units represented by the above given general formula (II) and the thus obtained block copolymer is hydrolyzed, for example, by using an acid so as to eliminate the groups protecting the phenolic hydroxy groups.

The above mentioned anionic living polymerization can be started by an organometallic compound as the polymerization initiator including n-butyl lithium, sec-butyl lithium, tert-butyl lithium, 2-methylbutyl lithium and the like, of which n-butyl lithium is particularly preferable. The amount of the polymerization initiator to be added to the polymerization mixture should be selected depending on the desired average degree of polymerization of the block copolymer because the degree of polymerization of the polymer obtained by the anionic living polymerization is determined by the amount of the polymerization initiator relative to the amount of the monomer or monomers to be polymerized therewith. It is desirable in this case that the segments consisting of the monomeric units represented by the above given general formula (IV) in the block copolymer is at least 10. In this regard, the concentration of the polymerization initiator is usually in the order ranging from 0.1 to 10 m moles per liter of the polymerization mixture.

The anionic living polymerization is usually carried out in an organic solvent. Examples of suitable organic solvents include benzene, toluene, n-hexane, tetrahydrofuran and the like conventionally used in anionic polymerization reactions in general. The concentration of the monomers in the polymerization mixture is preferably in the range from 1 to 10% by weight. The polymerization reaction is performed usually at room temperature with agitation of the polymerization mixture under high vacuum of a pressure not exceeding $10^{-5}$ Torr or in an atmosphere of an inert gas such as argon, nitrogen and the like after purification to remove any impurities such as water and the like having a disturbing effect on the polymerization reaction.

The block copolymer obtained by the anionic living polymerization is then dissolved in an organic solvent such as dioxane, acetone, methyl ethyl ketone, acetonitrile and the like and the solution is admixed under heating with an acid such as hydrochloric acid and hydroiodic acid to effect hydrolysis and elimination of the protecting groups of the phenolic hydroxy groups.

The thus obtained block copolymer is the precursor of the block-graft copolymer as the component (a) in the electrolyte composition used in the inventive lithium cell. The grafting reaction of the precursor block copolymer includes the steps of the carbanionization reaction of the phenolic hydroxy groups, growth of the grafting chains and termination reaction of the grafting reaction.

The carbanionization reaction of the precursor block copolymer is carried out by dissolving the block copolymer in an organic solvent for anionic polymerization reactions such as tetrahydrofuran and the like in a concentration of 1 to 30% by weight or, preferably, 1 to 10% by weight and then admixing the solution with a solution of an organometallic compound of an alkali metal in an organic solvent such as tetrahydrofuran followed by agitation of the reaction mixture at a temperature of 0° to 25° C. for 0.5 to 4 hours.

Examples of the organometallic compound of an alkali metal used in the above mentioned carbanionization reaction include, for example, tert-butoxy potassium, naphthalene potassium, diphenylethylene potassium, benzyl potassium, cumyl potassium, naphthalene sodium, cumyl cesium and the like, of which tert-butoxy potassium is particularly preferable.

Completion of the above described carbanionization reaction can be confirmed by the method of $^1$H-NMR. Thus, the product after termination of the reaction is reacted with trimethylsilyl chloride followed by the purification of the silylated copolymer by adding the reaction mixture into a large volume of methyl alcohol to give precipitates of the copolymer which are washed and dried. The thus obtained silylated copolymer is subjected to the measurement of the NMR spectrum to find disappearance of the phenolic hydroxy groups and to determine the increase in the amount of the trimethylsilyl groups. The method of gel-permeation chromatography is useful to confirm that the block segments are safe from the reactions of crosslinking or decomposition.

The thus carbanionized precursor block copolymer is then converted into the block-graft copolymer by the reaction with ethylene oxide or propylene oxide. Namely, the precursor block copolymer is admixed with ethylene oxide or propylene oxide in the gaseous from or liquid form and the mixture is agitated for 1 to 48 hours at a temperature of 0° to 80° C. The block-graft copolymer can be isolated from the reaction mixture by adding the reaction mixture into a large volume of water to precipitate the copolymer followed by filtration and drying.

The block-graft copolymer obtained by the above described procedure can be characterized by several means. For example, the number-average degree of polymerization can be determined by using a membrane osmometer. The structure and composition of the block-graft copolymer can be determined by the infrared absorption spectrophotometry and the method of $^1$H-NMR. The length and number of the grafting chains can be calculated from the above obtained results. Elution diagrams of the gel-permeation chromatography of the copolymer can provide information on the completeness of isolation of the copolymer and the molecular weight distribution of the copolymer.

The polymerization reaction for the preparation of the precursor block copolymer and the grafting reaction on to the precursor block copolymer are carried out usually in an organic solvent. Examples of preferable organic solvents therefor include those conventionally used in the anionic polymerization or ring-opening polymerization reactions such as tetrahydrofuran, dioxane, benzene and the like.

The polymerization reaction can be terminated by the addition of a stopping agent such as an acid, e.g., acetic acid, organic halide, e.g., methyl bromide and benzyl chloride, and organosilyl compound, e.g., trimethyl silyl chloride and tert-butyl dimethyl silyl chloride.

The length of the grafting chains can be controlled by adequately selecting the number of moles of the segments consisting of the monomeric units represented by the general formula (IV) in the block copolymer, the amount of the organometallic compound of an alkali metal used in the carbanization reaction and the amount of the alkylene oxide. Namely, the molar amount of the organometallic compound of an alkali metal should not exceed the number of moles of the monomeric units expressed by the general formula (IV) and the length of the grafting chains is expressed by the molar ratio of the alkylene oxide to the alkali organometallic compound multiplied by the molecular weight of the alkylene oxide.

When it is desired to prepare a block-graft copolymer of which the grafting chains have a numbre-average molecular weight of 7000, for example, 0.005 mole of the organometallic compound of an alkali metal should be added to mole of the block copolymer containing 0.007 mole of the block segments consisting of the monomeric units of the general formula (IV). When a block-graft copolymer of which the grafting chains have a number-average molecular weight of 45 is desired, the above mentioned reactants should be taken in equimolar amounts. Further, a block-graft copolymer having a number-average molecular weight intermediate between 45 and 2000 is desired, the above mentioned reactants should be taken in amounts to give a molar ratio between the above mentioned two cases.

The block-graft copolymer obtained in the above described manner as the component (a) is compounded with an ionic lithium salt as the component (b) and a poly(alkylene oxide) as the component (c) to give the polymeric solid electrolyte composition used in the inventive lithium cell. The method for compounding these components is not particularly limitative. For example, the block-graft copolymer is uniformly mixed with the ionic lithium salt and the poly(alkylene oxide) as being dissolved in an organic solvent such as 1,4-dioxane to give a solution of the composition. Alternatively, the block-graft copolymer is kneaded together with the ionic lithium salt and the poly(alkylene oxide) by a mechanical means at room temperature or at an elevated temperature.

The lithium cell of the invention is obtained by filling the space between an anode and a cathode made from metallic lithium or a lithium-based alloy facing the anode with the above described polymeric solid electrolyte composition. Shape and size of the lithium cell are not particularly limitative but the invention is particularly advantageous when it is applied to those lithium cells having a greatly decreased thickness.

In the following, a description is given of the structure of the inventive lithium cell of, in particular, small thickness-type by making reference to FIG. 1 as an illustration of an embodiment of the invention.

The lithium cell illustrated in the figure by a vertical cross sectional view has a positive collector plate 1 in the form of a square plate made from stainless steel and a negative collector plate 2 in the form of a square dish also made from stainless steel. The peripheral portion of the negative collector plate 2 is bent so as to form a flange 2a. The positive collector plate 1 and the negative collector plate 2 are adhesively bonded together by means of an adhesive layer 3 at the respective peripheral areas 1a, 2a forming a space 4 surrounded thereby. The space 4 includes an anode 5 in contact with the positive collector plate 1 and a cathode 6 made from metallic lithium or a lithium-based alloy in contact with the negative collector plate 2 sandwiching a layer 7 of a polymeric solid electrolyte composition. The anode is fixed with an insulating square frame 8 made from, for example, polypropylene.

The adhesive layer 3 in the above described lithium cell can be formed by using a conventional adhesive composition of a solution type but it would be more advantageous to use a sheet of a hot-melt adhesive shaped in advance in the form of a square frame. Namely, a sheet of a hot-melt adhesive is shaped by punching into a square frame having a width corresponding to the width of the peripheral areas 1a, 2a of the positive and negative collector plates 1,2 and the frame-formed adhesive sheet 3 is sandwiched between the peripheral areas 1a, 2a which are pressed together and heated as such at a temperature higher than the melting point of the adhesive followed by cooling so that the positive and negative collector plates 1,2 are adhesively bonded together at the respective peripheries 1a, 2a. This method is advantageous not only in respect of the high working efficiency but also in respect of the absence of the drawback caused by the contamination of the electrolyte composition 7 or surface of the electrodes 5, 6 as is sometimes unavoidable in the use of a solution-type adhesive. The hot-melt adhesive includes, in addition to those based on a hot-melt resin, ceramic-based ones capable of giving hermetic sealing.

The material of the anode 5 is not particularly limitative including those used as an anode-active material in conventional lithium cells. Examples of suitable anode-acitve materials include inorganic ones such as $MnO_2$, $TiS_2$, $MoS_2$, $V_6O_{13}$, $V_2O_5$, $NiPS_3$ and the like as well as electroconductive polymers such as polyanilines, polyacetylenes and the like. These materials can be used either singly or as a combination of two kinds or more according to need.

The material of the cathode 6 can be metallic lithium or a lithium-based alloy provided that lithium is the principal constituent thereof.

Although the above description is given for a lithium cell of which the positive and negative collector plates are, one, in the form of a flat plate and, the other, in the form of a dish, it is of course posssible that the positive and negative collector plates are each in the form of a flat plate and they are bonded together at the respective peripheries by sandwiching a spacer of a suitable material such as ceramics adhesively bonded to the collector plates. It is also possible that the form of the lithium cell is rectangular, polygonal or circular in addition to the above described square form. The lithium cells prepared according to the invention may have a thickness as small as 1.0 mm or even smaller without substantially affecting the performance of the cell so as to ensure great advantages in the industrial application.

In the following, the lithium cell of the invention is illustrated in more detail by way of examples and comparative examples although the scope of the invention is never limited by these examples. In the following, symbols of "-b-" and "-g-" are used for designating a block copolymer and a graft copolymer, respectively. For example, a "poly(styrene-b-p-hydroxystyrene-b-styrene)" is a block copolymer consisting of the segments of the monomeric units formed of styrene, p-hydroxystyrene and styrene. Further, a "poly[styrene-b-(p-hydroxystyrene-g-ethylene oxide)-b-styrene] designates a block copolymer of poly(styrene-b-p-hydroxystyreneb-styrene) in which grafting chains are introduced as bonded to the hydroxy groups of the p-hydroxystyrene units by the reaction of ethylene oxide.

EXAMPLE 1

A polymeric electrolyte composition in the form of a solution was prepared by dissolving, in 30 ml of a 4:1 by volume mixture of tetrahydrofuran and methyl alcohol, 3.0 g of a poly[styrene-b-(p-hydroxystyrene-g-ethylene oxide)-b-styrene] having an average molecular weight of 200,000, of which the weight fraction of the poly-(ethylene oxide) moiety was 30%, 0.15 g of lithium perchlorate $LiClO_4$ and 2.1 g of a polyethylene glycol dimethyl ether having an average molecular weight of 350. The solution was cast on a sheet of Teflon resin followed by heating at 60° C. for 24 hours under a reduced pressure to give a dried film of the composition having a uniform thickness of about 100 μm. The film of the polymeric solid electrolyte composition thus obtained had an ionic conductivity of $4.0 \times 10^{-3}$ S/cm.

Separately, amorphous vanadium pentoxide was prepared by melting crystalline vanadium pentoxide $V_2O_5$ at 800° C. followed by quenching. A vanadium pentoxide gel was prepared by dissolving the thus prepared amorphous vanadium pentoxide in water and standing the aqueous solution at room temperature. The aqueous amorphous vanadium pentoxide gel was applied to the 10 mm by 10 mm wide surface area of a 15 mm by 15 mm wide stainless steel square plate having a thickness of 20 μm to serve as the positive collector plate followed by drying to give a layer of amorphous vanadium pentoxide having a thickness of about 20 μm to serve as the anode-active material. This amorphous vanadium pentoxide layer was overlaid with a 10 mm by 10 mm wide film of the polymeric solid electrolyte composition and then a 9 mm by 9 mm wide square foil of metallic lithium having a thickness of 80 μm was put thereon as the cathode followed by compressing them together into a laminated structure.

A polyolefin-based hot-melt adhesive as molten was applied using an applicator to the marginal area of 2 mm width around the positive collector plate outside of the amorphous vanadium pentoxide layer and another 15 mm by 15 mm wide square stainless steel plate as the negative collector plate was put thereon and pressed on the marginal area followed by heating at 185° C. so as to melt the hot-melt adhesive and cooling so that the positive and negative collector plates were adhesively bonded together to give a lithium cell. of which the overall thickness was 0.5 mm, having the periphery hermetically sealed with the hot-melt adhesive.

Figure 2:
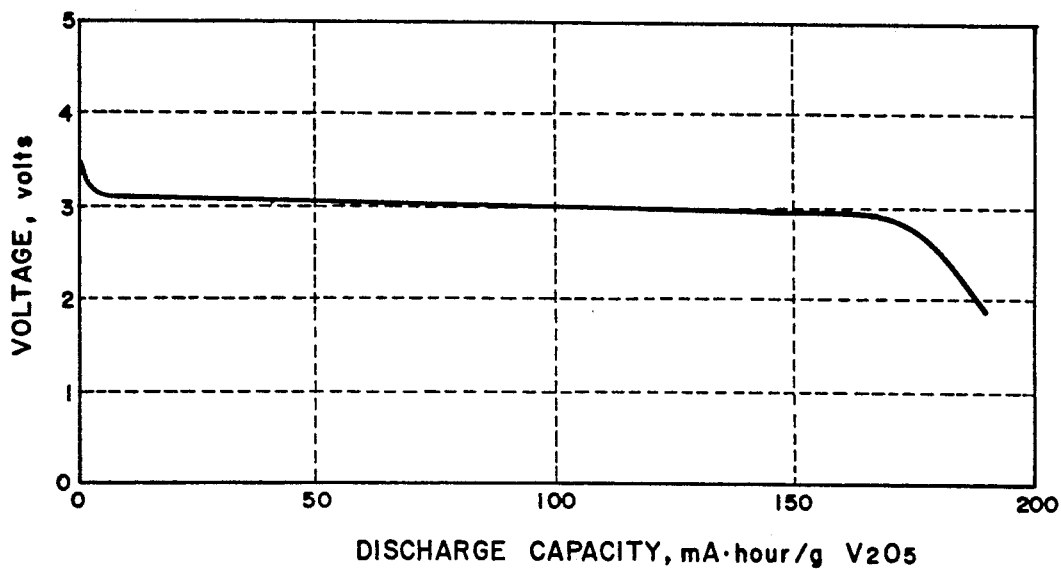
FIGS. 2, 3, 4 and 5 are each a graph showing the discharge characteristics of the lithium cells prepared in Examples 1 and 2 and Comparative Examples 1 and 2, respectively.

The lithium cell had an open-circuit voltage of 3.89 volts. Further, the lithium cell was subjected to the discharge test at a current density of 20 μA/cm² at room temperature to give the result shown by the discharge curve in FIG. 2 from which the discharge capacity was found to be 185 mA·hour per gram of vanadium pentoxide. Curve I of FIG. 6 shows the so-called cycle characteristic of the lithium cell which is expressed by the decrease in the relative discharge capacity, when the cycles of recharging and discharging at 2 volts and 4 volts, respectively, were repeated, as a function of the number of cycles.

EXAMPLE 2

Figure 3:
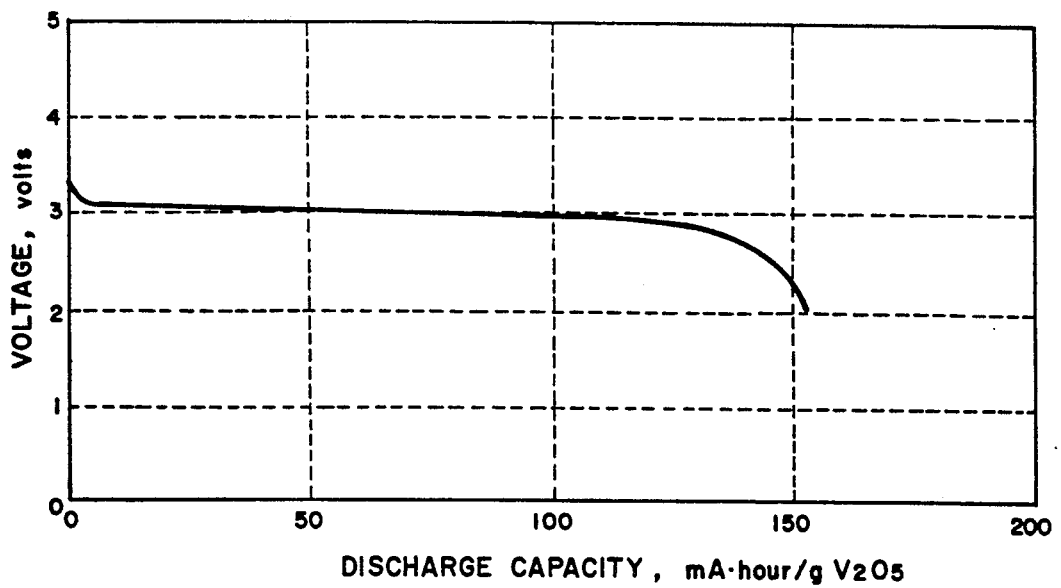

Another lithium cell similar to that in Example 1 was prepared in substantially the same manner as in Example 1 excepting replacement of 3.0 g of the poly[styrene-b-(p-hydroxystyrene-g-ethylene oxide)-b-styrene] with 2.0 g of another poly[styrene-b-(p-hydroxystyrene-g-ethylene oxide)-b-styrene] having an average molecular weight of 150,000, of which the weight fraction of the poly(ethylene oxide) moiety was 25%, and 0.15 g of the lithium perchlorate with 0.5 g of lithium borotetrafluoride $LiBF_4$. The lithium cell had an open-circuit voltage of 3.88 volts. The discharge characteristic thereof is shown in FIG. 3 and the cycle characteristic thereof is shown by the curve II in FIG. 6 each as determined in the same manner as in Example 1.

COMPARATIVE EXAMPLE 1

A solution of a polymeric electrolyte composition was prepared by dissolving, in 5 ml of acetonitrile, 1.0 g of a polyethylene oxide having a number-average molecular weight of 600,000 and 0.236 g of lithium trifluoromethane sulfonate $LiCF_3SO_3$ under agitation. The solution was cast on a Teflon plate followed by evaporation of the solvent by standing in a stream of argon at room temperature and complete drying by heating at 130° C. under a reduced pressure to give a film of a polymeric solid electrolyte composition having a thickness of 20 μm. This film of electrolyte composition had an ionic conductivity of $1.0 \times 10^{-6}$ S/cm.

Figure 4:
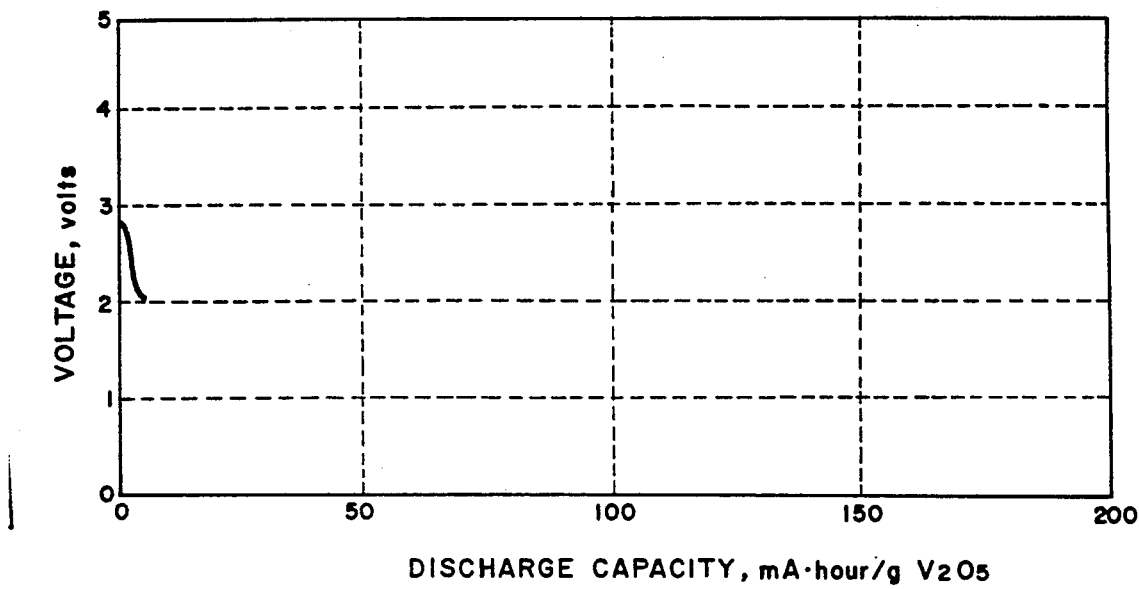

The above prepared film of the electrolyte composition was used in the preparation of a lithium cell in substantially the same manner as in Example 1, of which the discharge characteristic was as shown in FIG. 4 and the cycle characteristic was as shown by the curve III in FIG. 6.

COMPARATIVE EXAMPLE 2

A solution of a polymeric electrolyte composition was prepared by dissolving, in 60 ml of a 4:1 by volume mixture of dioxane and ethyl alcohol, 3.0 g of the same poly[styrene-b-(p-hydroxystyrene-g-ethylene oxide)-b-styrene] as used in Example 1 and 0.15 g of lithium perchlorate with omission of the polyethylene glycol dimethyl ether and a dried film of a polymeric solid electrolyte composition having a thickness of 70 μm was prepared from the thus prepared solution in substantially the same manner as in Example 1.

Figure 5:
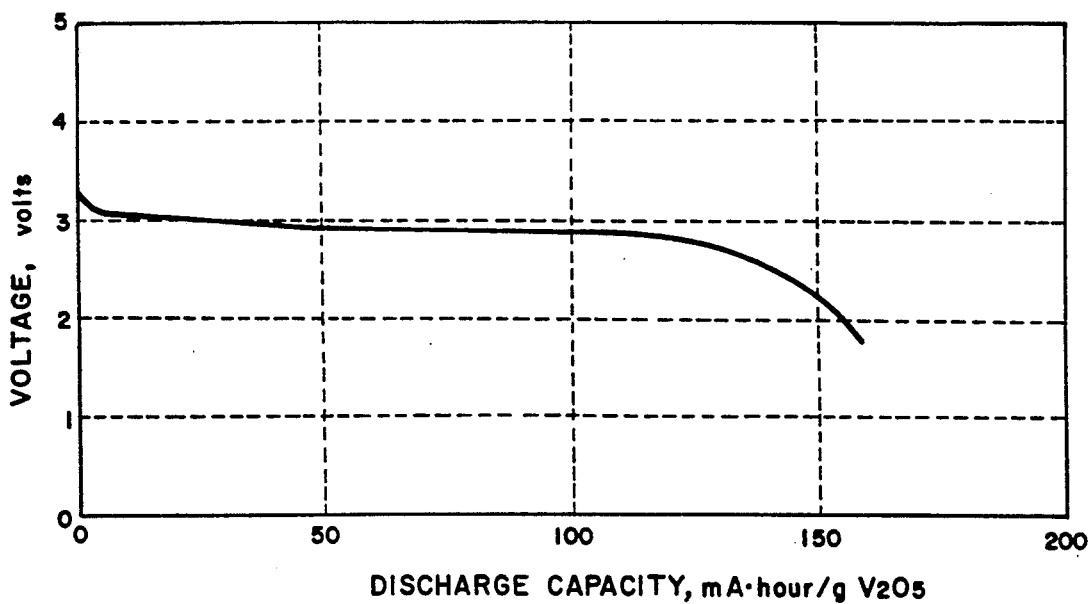

The above prepared film of the electrolyte composition was used in the preparation of a lithium cell in substantially the same manner as in Example 1, of which the discharge characteristic was as shown in FIG. 5 and the cycle characteristic was as shown by the curve IV in FIG. 6.

What is claimed is:

1. A lithium cell consisting of an anode, a cathode facing the anode and a polymeric solid electrolyte composition filling the space between the anode and the cathode, the said polymeric solid electrolyte composition comprising:

(a) a block-graft copolymer consisting of block segments of a first monomeric unit having a grafting chain having a structure of polyoxyalkylene units represented by the general formula

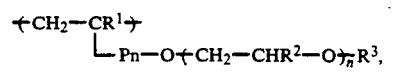

in which Pn is a 1,4-phenylene group, $R^1$ is a hydrogen atom, methyl group or ethyl group, $R^2$ is a hydrogen atom or methyl group, $R^3$ is an alkyl group, aryl group, acyl group or silyl group and the subscript n is a positive integer not exceeding 45, the graft chains expressed by the formula $-(-CH_2-CHR^2-O-)_n-R^3$ having a number-average molecular weight not exceeding 2000, and block segments of a second monomeric unit represented by the general formula $$-(-CH_2-CR^4M-)-,$$

in which $R^4$ is a hydrogen atom, methyl group or ethyl group and M is a group selected from the class consisting of vinyl, 1-methylethenyl, methoxycarbonyl, ethoxycarbonyl and unsubstituted or substituted phenyl groups;

(b) an ionic lithium salt; and (c) a poly(alkylene oxide) represented by the general formula $$R^5-O-(-CH_2-CHR^7-O-)_m-R^6,$$

in which $R^5$ and $R^6$ are each, independently from the other, a hydrogen atom or an alkyl group having 1 to 3 carbon atoms, $R^7$ is a hydrogen atom or a methyl group and the subscript m is a positive integer not exceeding 45, having a number-average molecular weight not exceeding 2000.

2. The lithium cell as claimed in claim 1 in which the block segments of the first monomeric units in the block-graft copolymer as the component (a) have a degree of polymerization of at least 10.

3. The lithium cell as claimed in claim 1 in which the block segments of the second monomeric units in the block-graft copolymer as the component (a) have a degree of polymerization of at least 300.

4. The lithium cell as claimed in claim 1 in which the molar ratio of the first monomeric units to the second monomeric units in the block-graft copolymer as the component (a) is in the range from 1:30 to 30:1.

5. The lithium cell as claimed in claim 1 in which the group M and the group $R^4$ in the second monomeric unit of the block-graft copolymer as the component (a) are a phenyl group and a hydrogen atom, respectively.

6. The lithium cell as claimed in claim 1 in which the amount of the ionic lithium salt as the component (b) is in the range from 0.05 to 80 moles per mole of the monomeric units of the alkylene oxide in the grafting chains in the block-graft copolymer as the component (a).

7. The lithium cell as claimed in claim 1 in which the amount of the poly(alkylene oxide) as the component (c) is in the range from 0.05 to 200 moles per mole of the monomeric units of the alkylene oxide in the grafting chains in the block-graft copolymer as the component (a).

8. The lithium cell as claimed in claim 1 in which the poly(alkylene oxide) as the component (c) has a molecular weight in the range from 130 to 2000.

* * * * *